(12) United States Patent
Bawaskar et al.

(10) Patent No.: US 9,639,548 B2
(45) Date of Patent: May 2, 2017

(54) SELECTING FILES FOR COMPACTION

(71) Applicant: Pivotal Software, Inc., San Francisco, CA (US)

(72) Inventors: Swapnil Prakash Bawaskar, Hillsboro, OR (US); Daniel Allen Smith, Portland (CA); Anthony M. Baker, Sherwood, OR (US); Jagannathan Ramnarayanan, Portland, OR (US); Hemant Bhanawat, Maharashtra (IN)

(73) Assignee: Pivotal Software, Inc., San Francisco, CA (US)

( * ) Notice: Subject to any disclaimer, the term of this patent is extended or adjusted under 35 U.S.C. 154(b) by 189 days.

(21) Appl. No.: 14/526,416

(22) Filed: Oct. 28, 2014

(65) Prior Publication Data

US 2015/0120684 A1    Apr. 30, 2015

Related U.S. Application Data

(60) Provisional application No. 61/962,023, filed on Oct. 28, 2013, provisional application No. 61/896,658, filed on Oct. 29, 2013.

(51) Int. Cl.
G06F 17/30    (2006.01)

(52) U.S. Cl.
CPC .. *G06F 17/30153* (2013.01); *G06F 17/30097* (2013.01)

(58) Field of Classification Search
None
See application file for complete search history.

(56) References Cited

U.S. PATENT DOCUMENTS

| | | | |
|---|---|---|---|
| 2003/0198381 A1 | 10/2003 | Tanaka et al. | |
| 2004/0098427 A1* | 5/2004 | Peng | G06F 8/665 |
| 2006/0005013 A1 | 1/2006 | Huitema et al. | |
| 2006/0059253 A1* | 3/2006 | Goodman | G06Q 10/10 |
| | | | 709/223 |
| 2008/0126357 A1 | 5/2008 | Casanova et al. | |
| 2010/0010967 A1 | 1/2010 | Muller | |
| 2012/0284587 A1* | 11/2012 | Yu | G06F 3/0608 |
| | | | 714/773 |

(Continued)

OTHER PUBLICATIONS

International Preliminary Report on Patentability in Application No. PCT/US2014/062737, mailed May 12, 2016, 7 pages.

(Continued)

*Primary Examiner* — Wilson Lee
(74) *Attorney, Agent, or Firm* — Fish & Richardson P.C.

(57) ABSTRACT

Methods, systems, and apparatus for identifying two or more files, each of which include multiple entries, determining a respective size of each of the files, each size being an estimate of how many distinct entries exist in the respective file that are not garbage entries, determining a combined size of the files, where the combined size of the files is an arithmetic sum of the respective sizes of the files, estimating a compacted size of the files, where the estimated compacted size of the files is an estimate of how many distinct entries exist in the files that are not garbage entries, selecting the two or more files for compaction, based at least on a comparison of the combined size of the files to the estimated compacted size of the files, and compacting the two or more selected files.

27 Claims, 4 Drawing Sheets

(56) References Cited

U.S. PATENT DOCUMENTS

| | | |
|---|---|---|
| 2013/0110778 A1 | 5/2013 | Taylor et al. |
| 2013/0117240 A1 | 5/2013 | Taylor et al. |
| 2013/0163659 A1 | 6/2013 | Sites |
| 2014/0279881 A1* | 9/2014 | Tan .................. G06F 17/30345 707/613 |
| 2015/0156213 A1* | 6/2015 | Baker ................ H04L 63/1416 726/23 |

OTHER PUBLICATIONS

Flajolet et al., "HyperLogLog: the analysis of a near-optimal cardinality estimation algorithm," Conference on Analysis of Algorithms, 2007, AofA 07, Jun. 22, 2007, Retrieved form the Internet: URL <http://www.dmtcs.org/dmtcs-ojs/index.php/proceedings/article/viewFile/dmAH0110/2100>, 20 pages.

International Search Report and Written Opinion in International Application No. PCT/US2014/062737, dated Feb. 23, 2015.

* cited by examiner

SELECTING FILES FOR COMPACTION

CROSS-REFERENCE TO RELATED APPLICATIONS

This application claims the benefit of U.S. Provisional Patent Application Ser. No. 61/962,023, filed Oct. 28, 2013 and U.S. Provisional Patent Application Ser. No. 61/896,658, filed Oct. 29, 2013, both of which are incorporated by reference in their entirety.

TECHNICAL FIELD

This specification relates to cloud computing and to selecting data files stored in cloud computing environments for compaction.

BACKGROUND

In cloud computing, data is often distributed to a system of multiple computers connected by one or more communications networks. The system can persist data by storing the data, or different versions of the data, on nonvolatile memory devices, e.g., flash memory or disk memory devices, associated with one or more of the multiple computers. Garbage data can accumulate in the system as files stored by the system are updated such that previous versions of the files store outdated information or redundant occurrences of information.

SUMMARY

A database system, e.g., a distributed parallel processing database system, receives data provided by users of the system. The system stores the data on one or more nodes of the system, and the system can process the data in parallel on the one or more nodes. Users can request the system to perform operations relating to data stored by the system. Requests by the users can include, for example, requests to update data stored by the system, requests to insert new data to be stored by the system, requests to delete data stored by the system, or requests to synchronize data stored by the system with external data repositories.

Requests to perform operations are placed in a queue. To ensure that operations in the queue are not lost, the system can flush the queue. When the queue is flushed, the system stores information about the requested operations in a log file. The log file can identify a set of requested operations, including times when users requested the operations, particular data to perform operations on, and what operations to perform on the data. The system flushes the queue periodically and a new log file is created with each queue flush. The system can access the log files to determine operations to perform on data stored by the system.

The system performs compaction on log files to remove garbage data from the log files. Garbage data is data that has been deleted, or that has been changed, with the result that the data in the log file has become outdated. To limit the number of log files stored by the system, and to improve read performance of the log files by the system, the system occasionally performs compaction on, i.e., compacts, the log files. When compaction is performed on the log files, one or more existing log files are compacted, and a new log file is created that includes relevant information from the existing log files, while omitting garbage data from the existing log files.

To minimize overhead associated with performing compaction, the system selects particular sets of log files to compact. The system selects log files to compact based on the cardinality of the set of log files, in other words, based on the number of unique requests identified by the set of log files. The system determines the cardinality of each log file of the set of log files. The cardinalities of each log file are combined to determine a total cardinality of the set of log files. The system compares the cardinality of the set of log files to the arithmetic sum of the cardinalities of each of the log files. Based on the comparison of the cardinality of the set of log files and the sum of the cardinalities of each of the log files, the system determines whether to perform compaction on the set of log files.

For example, the system may determine in a particular case that a first log file and a second log file both have a cardinality of 500; the sum of the cardinalities is 1000. The system also determines that a combined cardinality of the set of the first and second log files is 950. Based on a comparison of the sum of the cardinalities of the first and second log files and the cardinality of the set of the first and second log files, the system determines that 50 of the entries included in the first log file are also included in the second log file. The system can determine whether to perform compaction of the first and second log files into a single log file based on determining that 50 of the entries included in the first log file are also included in the second log file.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
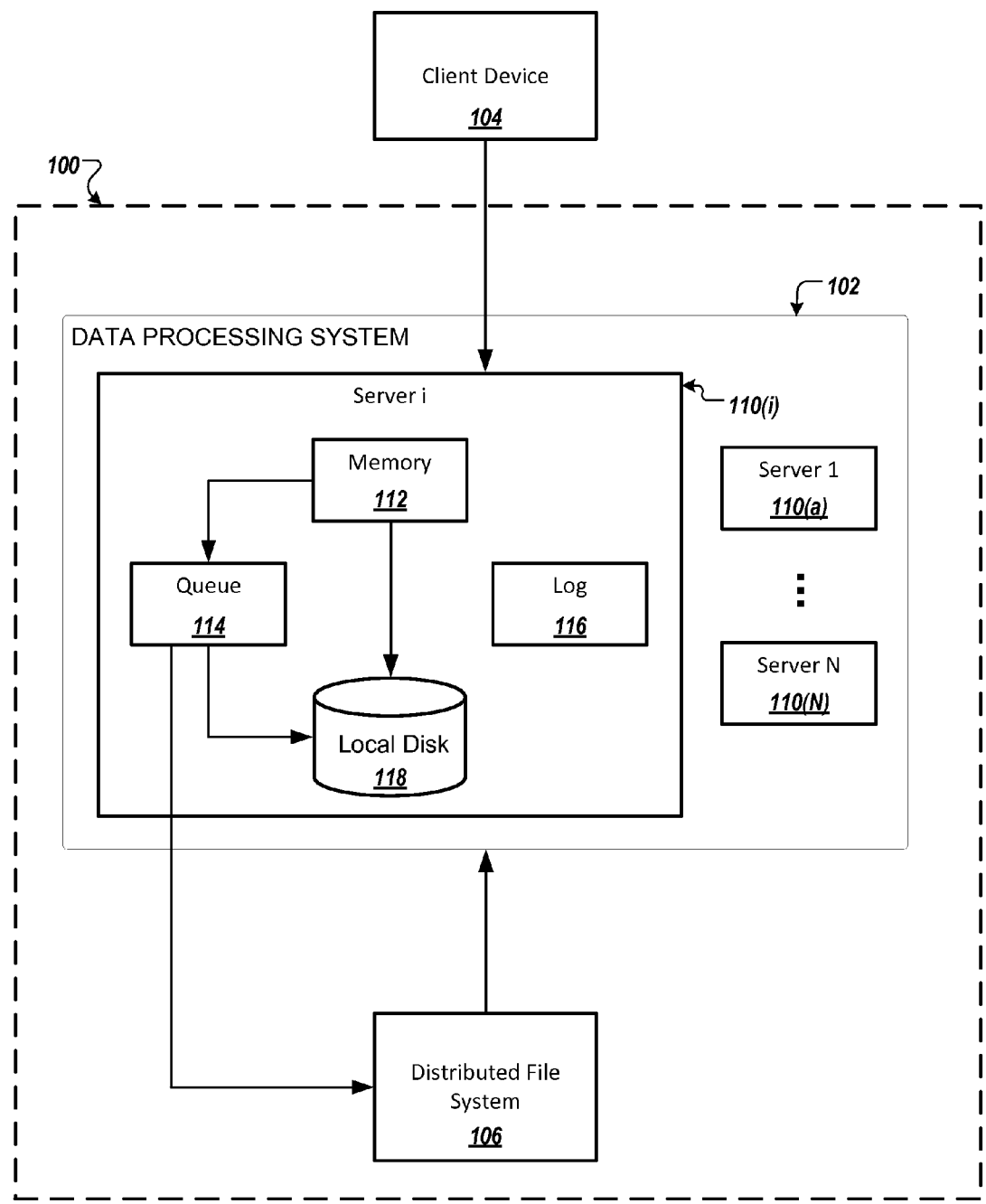
FIG. 1 shows an example system for storing data.

FIG. 1 is a block diagram of an example system 100 for storing data on a distributed database and processing stored data. The system 100 is a memory-optimized, distributed data store configured to perform online transaction processing (OLTP) tasks including, for example, database query processing and data modeling. The system 100 includes a data processing system 102 for in-memory storage and processing of operational data, and a distributed file system 106 for data persistence and scalability. Data persistence includes storing non-operational data on nonvolatile memory, e.g., flash memory or disk. Scalability is an ability of the system 100 to store large volume of data including multiple large files, e.g., files the size of which reaches several terabytes. An example of the distributed file system 106 is the Hadoop™ Distributed File System (HDFS™). ("Hadoop" and "HDFS" are trademarks of the Apache Software Foundation.)

The data processing system 102 includes multiple members. The members are connected to each other through a communications network, e.g., a wide area network (WAN), in a peer-to-peer (P2P) topology. Each peer member maintains persistent communication channels to every other peer member in the data processing system 102. Each member includes a server; the member and server are implemented on a computer having one or more processors, memory, and one or more disks local to the server. The member and server may be implemented on virtual machine running on the computer. Each server can execute a Java Virtual Machine (JVM), in which data operations are performed. In the example system shown, the members of the data processing system 102 include a first server 110(a), an i-th server 110(i), through an N-th server 110(N). The data processing system 102 can distribute a large database table having multiple data records for storage on the first server 110(a), i-th server 110(i), through N-th server 110(N) by partitioning the database table into logical buckets. Each bucket is a container for data and is associated with one or more servers for storing and processing the data in the container.

The data processing system 102 partitions the database table into the buckets according to a partition strategy associated with the database table, for example, as specified in a "PARTITION BY" clause in a "CREATE TABLE" statement. A data record in the database table can be distributed to one of the buckets based on the partition strategy, e.g., by hashing a primary key in the data record. Each logical bucket can be assigned to one or more of the first server 110(a), i-th server 110(i), through N-th server 110(N). Each of the first server 110(a), i-th server 110(i), through N-th server 110(N) can store a mapping between all clusters and all servers, including which server stores which bucket.

The data processing system 102 is configured to receive a data update request from a 104. The data update request can include a structured query language (SQL) statement, or a SQL-like statement, for inserting, deleting, or updating multiple rows of data in a databases table that is distributed among the first server 110(a), i-th server 110(i), through N-th server 110(N). The data update request can be replicated among the first server 110(a), i-th server 110(i), through N-th server 110(N). On each server, e.g., the server 110(i), the data update request is stored in a queue 114. The queue 114 can store multiple requests that, each in turn, cause data on the portion of the database table distributed to the server 110(i) to be updated.

The update can occur in memory 112, e.g., when the data being updated is designated as operational data. The data can be designated as operational data by a user, for example, using a data definition language (DDL) extension statement specifying a condition. Additionally or alternatively, the update can occur in the distributed file system 106. For example, when the server 110(i) ingests a large amount of data, e.g., when the data does not fit into the memory 112, the data can be streamed to the distributed file system 106. In addition, operational data can be evicted from memory and stored in the distributed file system 106.

The server 110(i) maintains operation logs ("logs") 116. The operation logs 116 are used by the server 110(i) to record a history of updates on each database table or on each data record, based on a log setting. The operation logs 116 can be persisted by the server 110(i) to the local disk 118 or the distributed file system 106 as log files according to the log setting. The operation logs 116 are compacted by the server 110(i) or another component of the system 100, e.g., the distribute file system 106, according to a compaction strategy. For example, a compaction strategy can specify that obsolete operations be removed from a log file when the size of the log file reaches a threshold, e.g., 500 megabytes, one gigabyte (1 GB) or 2 GB. The log setting and compaction strategy can be specified by a user in a configuration file.

In some implementations, the system 100 comprises a log-structured merge-tree (LSM-tree). The LSM-tree can be distributed on multiple nodes of the system 100. For example, the LSM-tree can maintain data in one or more of the servers 110(a)-110(N). In some implementations, the LSM-tree can be distributed on one or more of the servers 110(a)-110(N), for example, in the memory 112 or local disk 118 of a particular server 110(i), and/or the LSM-tree can be distributed on the distributed file system 106. The LSM-tree can include the operation log data stored in the operation logs.

Figure 2:
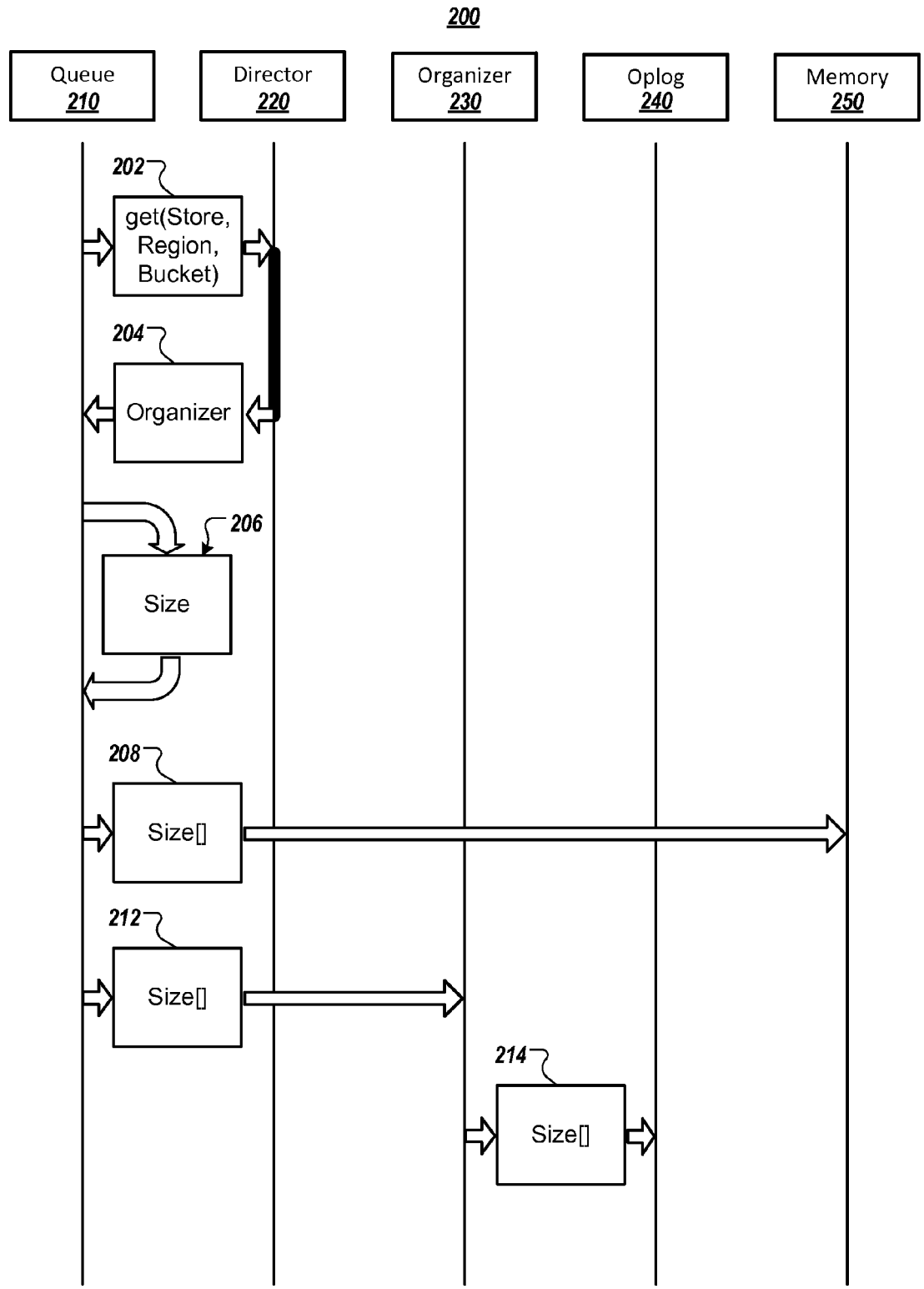
FIG. 2 shows an example process for storing file cardinality.

FIG. 2 shows an example process 200 for determining and storing information that identifies the cardinality of a log file. The process 200 is performed by the system 100 of FIG. 1. In some implementations, the system 100 performs the process 200 based on the system 100 determining to flush the queue 114. In other implementations, the system 100 performs the process 200 based on the system 100 determining to perform other operations, for example, when the system 100 compacts two or more log files to create a single compacted log file.

In some implementations, a partitioned table is stored by a distributed parallel processing database system and has several buckets. Log files are written for each bucket. The cardinality of the log file is a count of the number of unique entries in the log file. What will be referred to as the "size" of a log file is an estimate of its cardinality, determined as will be described below. The system stores a compact representation of the cardinality in memory for each of the log files, identifying a size of each bucket. This in-memory representation is updated each time that a new log file is created, e.g., each time that the system flushes the queue 114, or each time that compaction occurs. The computed representation for each log file is stored in a metadata section of each log file, or is otherwise stored and associated with each log file.

To store the representation that identifies the size of a bucket or log file, a queue manager 210 of the system provides (202) data to a director 220 that identifies a particular data store, region, and bucket. For example, the distributed file system 106 of the system 100 can store log files on a particular data store associated with the distributed file system 106. The particular data store is associated with region folders such that each region folder is associated with one or more bucket folders that store log files.

The queue manager 210 can transmit the data identifying the particular data store, region, and bucket to the director 220 to indicate where a new log file is to be stored. The queue manager 210 can transmit the data identifying the location of the new log file in response to the system determining to perform a flush of the queue 210.

In response to receiving the data from the queue manager 210 identifying the particular data store, region folder, and bucket folder, the director 220 transmits (204) data to the queue 210 that identifies an organizer 230. The organizer 230 is a component of the system 100 that provides an interface between the queue manager 210 and a particular log file. Thus, the queue manager 210 can store data in a log file by transmitting the data to the organizer 230, so that the organizer 230 can store the data in the appropriate log file, e.g., a log file associated with the identified data store, region folder, and bucket folder.

The queue manager 210 determines (206) a size of the queue, e.g., queue 114 (FIG. 1), for example, the number of requested operations that are identified in the queue. The queue manager 210 can determine the size of the queue as a result of the system 100 determining to flush the queue. In other implementations, the queue manager 210 can determine the size of the queue as a result of another event, for example, based on the system 100 determining to compact one or more log files.

Since the size of the queue is an estimate of the number of requests that are identified in the queue, excluding any repeated requests in the queue, the size of the queue is an estimate of the cardinality of the queue. In some implementations, the queue manager 210 can determine the size of the queue using an algorithm that determines the cardinality of a file or table, for example, the HyperLogLog (HLL) algorithm, or a similar algorithm, for example, the LogLog algorithm or SuperLogLog algorithm. Other algorithms for estimating the cardinality of a data set may be applied by the system to determine the size of the queue.

For implementations in which the HLL algorithm is used, a vector "size[ ]" is computed that represents the size of the queue. Size[ ] may include one or more elements that each have, for example, a 'byte' data type. In some implementations, size[ ] can identify only the size of the queue, and thus may have only a single entry that indicates the size of the queue. Alternatively, size[ ] may indicate both the size of the queue as well as hashed values of the entries in the queue, and therefore may include a number of entries.

To compute size[ ], each key associated with an operation request in the queue is hashed. A key identifies particular data stored by the distributed parallel processing database system. The HLL algorithm can use a first set of k bits in the hashed key to determine an index in size[ ]. The HLL algorithm then records the number of leading zeros in the remaining bits of the hashed bits, retaining the largest number of leading zeros in the remaining bits. The number of leading zeros in the remaining bits is used to estimate the number of elements in the queue. The system stores size[ ], which represents an estimate of the number of unique requests in the queue. In some implementations, the number of bits k can be configured; using a larger number of k bits in the hashed key to determine the index in size[ ] increases the accuracy of estimating the cardinality of the file.

The system stores (208) size[ ] that represents the size of the queue in memory 250 associated with the system. In some implementations, a previous version of size[ ] can be stored in the memory 250. Based on receiving the data associated with size[ ], the memory 250 updates the previous version of size[ ] to identify the known size of the queue according to the present queue. In other implementations, the memory 250 stores size[ ] in addition to one or more previous versions of size[ ]. For example, the memory 250 can store a new version of size[ ] each time that the queue is flushed without removing or overwriting previous versions of size[ ]. The memory 250 can store additional information associated with size[ ], for example, a timestamp associated with size[ ].

In some implementations, the system computes size[ ] for each bucket folder of the system, and stores size[ ] at the memory 250 for each of the bucket folders. In some implementations, the system computes size[ ] for each bucket folder of the system, and stores size[ ] that identifies a sum of the sizes computed for each of the bucket folders. In some instances, the system computes size[ ] each time that the system flushes the queue or compacts one or more log files, and the system updates size[ ] stored at the memory 250 each time that the system flushes the queue or compacts log files.

The system also sends (212) size[ ] to the organizer 230. Size[ ] can be the same vector size[ ] stored in the memory 250, or can be a modified vector size[ ]. Again, size[ ] can identify the size of the queue, specifically, by identifying the cardinality of the queue.

The organizer 230 receives size[ ] from the queue 210, and stores (214) size[ ] in a log 240. The log 240 is a log file that stores information identifying requested operations for the system to perform. In some implementations, organizer 230 stores size[ ] in the log 240 in addition to storing information associated with a flush of the queue. In some implementations, the organizer 230 stores size[ ] in the log 240, where the log 240 is a compacted log file. For example, based on the log 240 being a compacted log file, the log 240 can store size[ ] in addition to information obtained by performing one or more flushes of the queue, e.g., from one or more log files that are each associated with a flush of the queue at different times.

In some implementations, the organizer 230 stores size[ ] in a header of the log 240. In other instances, the organizer 230 can store size[ ] in metadata associated with the log file log 240, or can store size[ ] in association with the log 240 in a different way, for example, such that the processing system can access size[ ] when performing a particular operation. For example, the system can store size[ ] and can access size[ ] to determine a size of the queue at the time of a queue flush that resulted in the creation of a log file. Similarly, the system can store size[ ] to determine a size of the queue at the time of other operations, for example, at a time when two or more log files were compacted by the system.

While described with respect to log files, the process 200 is applicable to storing other data in the system. For example, when a user inserts or updates data distributed on the system, the system determines a size of the data in terms of the number of unique entries represented in the data, and stores a compact representation in association with the data that represents an estimate of the cardinality of the data.

Figure 3:
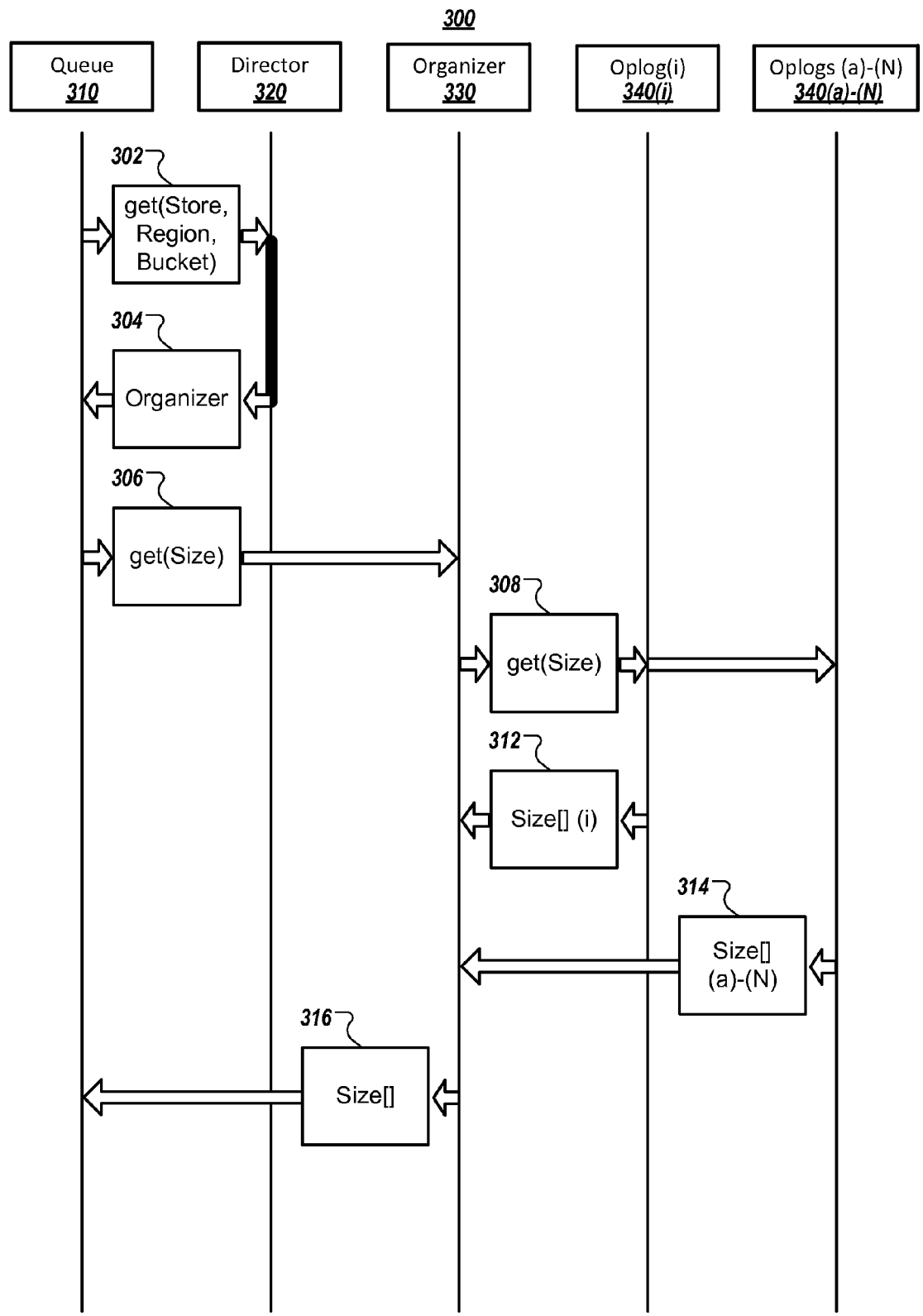
FIG. 3 shows an example process for determining file cardinality.

FIG. 3 shows an example process 300 for determining the cardinality of one or more files. The process 300 is performed by the system of FIG. 1. In some implementations, the system 100 performs the process 300 based on the system 100 restarting. For example, when the system 100 restarts, the system 100 performs the process 300 to determine the number of requests in the queue, e.g., the queue 114. In other implementations, the system 100 performs a process similar to the process 300 when the system 100 performs compaction on one or more files, e.g., one or more log files. For example, the system 100 can perform the process 300 after the compaction of two or more log files to determine the number of unique requests in the queue after garbage data is removed.

In some implementations, the process 300 enables the system to determine the size of the queue. The system determines the size of the queue based on persisted data identifying the size of a log file associated with a previous queue flush. Specifically, the system accesses a vector size[ ] associated with a log file to identify the size of the queue at the time of a previous queue flush. The persisted data can also enable the system to determine the total size of all log files, based on analysis of the vectors size[ ] associated with all of the existing log files.

To determine the size of a single log file or a total size of all log files, the queue manager 310 of the system provides (302) data to a director 320 that identifies a particular data store, region, and bucket. For example, the distributed file system 106 of the system 100 stores log files, where the log files stored by the distributed file system 106 are stored on a particular data store associated with the distributed file system 106. The particular data store is associated with region folders, and each region folder is associated with one or more bucket folders that store log files.

In some implementations, the director 320 receives information from the queue manager 310 that identifies the locations of two or more log files. In these instances, the queue manager 310 provides data that identifies two or more data store, region, and bucket locations. Each data store, region, and bucket location identifies a bucket, and each bucket is associated with a log file. Each log file is associated with a vector size[ ] that identifies an estimate of the cardinality of the log file, that is, the number of unique requests that are identified in the log file.

In response to receiving the data from the queue manager 310 that identifies the one or more data store, region folder, and bucket folder locations, the director 320 transmits (304) data to the queue manager 310 that identifies one or more organizers 330. The one or more organizers 330 are components of the system that provide an interface between the queue manager 310 and one or more log files. Thus, the queue manager 310 can receive information identifying the sizes of one or more log files, e.g., the bytes size[ ] associated with one or more log files, by receiving data from the one or more organizers 330 that are able to access the log files.

The organizers 330 identify the sizes of one or more log files from data in the one or more log files. For example, a particular log file can store size[ ] that indicates the size of the log file in a metadata section of the log file. An organizer 330 can receive or access information identifying the size of the particular log file by accessing the metadata section of the log file. The organizer 330 can transmit the data identifying the size of the log file to the queue manager 310.

The system sends (306) a request to the one or more organizers 330 that requests the sizes of one or more log files. For example, the queue manager 310 transmits a request to the one or more organizers 330 to receive size[ ] associated with each log file that the queue manager 310 identifies. The identified log files can be the log files identified by the queue manager 310 in the information transmitted to the director 320 that identified one or more data store, region folder, and bucket folder locations.

The one or more organizers 330 receive the information requesting the size of the one or more log files, and accesses (308) the one or more log files 340(a)-340(N), including the log file 340(i), to obtain the information identifying the size of the one or more log files 340(a)-340(N). For example, based on receiving information from the queue manager 310 that requests the size of the one or more log files 340(a)-340(N), the organizers 330 access the metadata section of each of the log files 340(a)-340(N). The metadata section of each log file 340(a)-340(N) can include a vector size[ ] that identifies the size of the log file.

In some instances, the queue manager 310 requests the size of more than one log file. In these instances, the queue manager 310 communicates with one or more organizers 330, where each organizer 330 is associated with one or more log files. For instance, an organizer 330 may be associated with a single log file, or the organizer 330 may be associated with multiple log files. Not all organizers 330 need be associated with the same number of log files. When an organizer 330 is associated with multiple log files, the information received from the queue manager 310 by the organizer 330 can identify one or more particular log files that the organizer 330 can access. For example, the information received by the organizer 330 can identify one or more particular data store, region folder, and bucket folder locations. Each data store, region folder, and bucket folder location can be used to access information identifying the size of a log folder associated with the identified bucket.

In some implementations, each of one or more organizers 330 receive data identifying the locations of all of the log files 340(a)-340(N), regardless of whether a particular organizer 330 is associated with a particular one of the identified log files 340(a)-340(N). In other implementations, each organizer 330 receives data identifying only the locations of the log files 340(a)-340(N) to which that organizer 330 has access. For example, a first organizer 330 associated with a subset of the identified log files 340(a)-340(N) can receive information identifying only the subset of the identified log files 340(a)-340(N) that it can access. A second organizer 330 associated with a different subset of the log files 340(a)-340(N), e.g., the remaining log files 340(a)-340(N) that are not accessible by the first organizer 330, can receive information identifying only the subset of the identified log files 340(a)-340(N) that it can access. The organizers 330 can use the received information to access data identifying the size of each of the log files 340(a)-340(N).

The one or more organizers 330 obtain (312, 314) data that identifies the size of each of the accessed log files 340(a)-340(N), including the log file 340(i). For example, the organizers 330 can access the metadata section of each of the log files 340(a)-340(N) and can obtain size[ ] of each of the log files 340(a)-340(N). In some implementations, the organizers 330 obtain the data associated with size[ ] for each log file 340(a)-340(N). In other implementations, the organizers 330 access size[ ] for each of the log files 340(a)-340(N) to determine the size of each of the log files 340(a)-340(N). The data representing the size of each of the log files 340(a)-340(N) can be data identifying the estimated cardinality of each of the log files 340(a)-340(N). The size of each log file 340(a)-340(N) can be a size estimate obtained by the system by using the HLL algorithm, or can be an estimate obtained using another method.

The queue manager 310 receives (316) data that identifies the size of the one or more log files. For example, the organizers 330 transmit data to the queue manager 310 that identifies the size of each of the log files 340(a)-340(N). The queue manager 310 receives the data that identifies the size of each of the log files 340(a)-340(N) and determines a size of the one or more log files 340(a)-340(N) based on the received data. In some instances, the queue 310 only requests the size of a single log file, for example, the log file 340(i), and the queue 310 receives data identifying the size of the log file, e.g., data representing the size of the log file 340(i). In other instances, the queue manager 310 requests the sizes of two or more log files 340(a)-340(N), and the queue manager 310 can determine a combined size of the two or more log files 340(a)-340(N) based on receiving data representing the size of the two or more log files 340(a)-340(N). For example, the queue manager 310 adds the individual sizes of the two or more log files 340(a)-340(N) to determine the combined size of the two or more log files 340(a)-340(N).

In some implementations, the information transmitted to the queue manager 310 is size[ ] associated with each of the log files 340(a)-340(N). In such instances, the queue manager 310 can determine the size of a single log file, for example, the log file 340(i), based on information associated with size[ ]. In other instances, the queue manager 310 can determine the size of two or more log files 340(a)-340(N) by combining the bytes size[ ] associated with each of the log files 340(a)-340(N). For example, the system determines the combined size of the two or more log files 340(a)-340(N) by determining the arithmetic sum of the individual sizes of the log files 340(a)-340(N). In other examples, the system determines a total size for the two or more log files 340(a)-340(N) by accessing information, e.g., information in the bytes size[ ] of each of the log files 340(a)-340(N), that allows the system to determine the number of unique requests in a set of data that includes all of the entries of the log files 340(a)-340(N).

While the operations of the process 300 for determining the cardinality of one or more files have been described as being performed by particular components of the system, in other implementations, the operations can be performed by different components of the system. For instance, the organizers 330 can combine the bytes size[ ] to determine a combined size of two or more log files 340(a)-340(N). The organizers 330 can then transmit data to the queue manager 310 that identifies the combined size of the two or more log files 340(a)-340(N). In other implementations, the one or more organizers 330 can transmit information to the director 320 that identifies the sizes of one or more log files 340(a)-340(N). If only one log file is identified, e.g., the log file 340(i), the director 320 can transmit information to the queue manager 310 that represents the size of the single log file, e.g., the size of the log file 340(i). In other examples, the director 320 can determine the combined size of two or more log files 340(a)-340(N), and can transmit information to the queue manager 310 that represents the combined size of the log files 340(a)-340(N). In other implementations, fewer, more, or different messages can be transmitted between the queue manager 310, director 320, one or more organizers 330, and one or more log files 340(a)-340(N) to determine the size of the one or more log files 340(a)-340(N).

Figure 4:
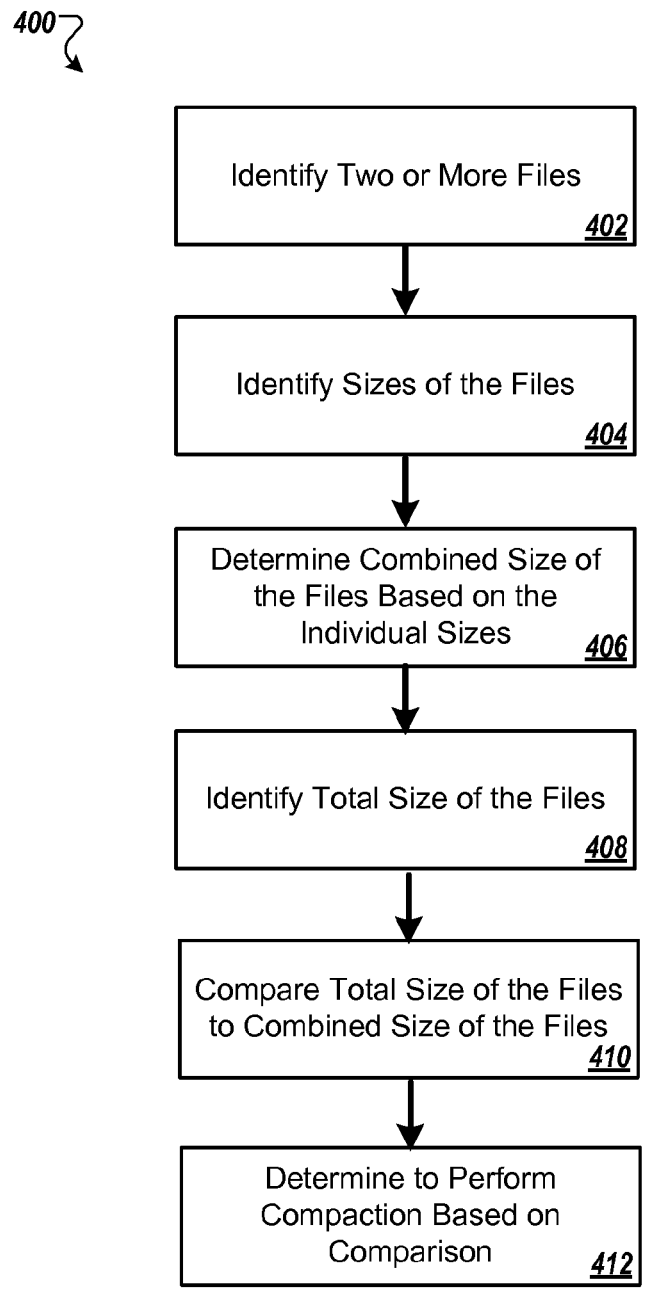
FIG. 4 is a flowchart of an example process for selecting files for compaction.

FIG. 4 shows a flowchart of an example process 400 for selecting files for compaction based on the sizes of the files. The process 400 is performed by the system 100 of FIG. 1, and the actors of FIGS. 2 and 3. In some implementations, the system 100 performs the process 400 to determine whether a set of files should be selected for compaction or not selected for compaction. In some implementations, the process 400 can be applied to two or more log files, or can be applied to two or more other files distributed on the system 100.

For example, the system 100 determines the sizes of two or more files by combining the individual sizes of the two or more files. In some implementations, the sizes of the two or more files are determined by an HLL algorithm, or other algorithm, for example, an algorithm that can estimate the cardinality of each of the files. In some implementations, the two or more files can be files stored on a LSM-tree of the system 100. The system combines the individual sizes of the two more files by determining the arithmetic sum of the sizes of each of the files. The system 100 can also determine a total size for the two or more files by estimating the number of unique entries in each of the two or more files. For example, a total size for the two or more files can be determined by combining bytes size[ ] associated with each of the two or more files. The system 100 can then determine an estimated compacted size for the two or more files, where the equivalent total size indicates an estimate of the cardinality of the files if they were compacted into a single file. The system 100 compares the combined size of the log files to the total size of the files. The difference in the combined size of the files and the estimated compacted size of the files represents the overlap between the two or more files. That is, the difference in the combined size and the estimated compacted size of the two or more files represents the number of repeated elements, e.g., repeated requests, included in the two files. If the number of repeated items in the files exceeds a certain threshold number, the system 100 selects the files for compaction. If the number of repeated elements in the files does not exceed a certain threshold number, the system 100 does not select the files for compaction.

The system 100 uses the process 400 to reduce the overhead associated with performing compaction. Specifically, the process 400 can reduce overhead associated with loading files, e.g., log files, and can minimize garbage data in the system 100. When data is loaded to the system 100, there will generally not be an overlap in the records being inserted. Performing compactions on these files will therefore result in the system 100 performing compaction on the files repeatedly even though there is little or no garbage data in the files. At other times, however, two or more files may be determined to have a large amount of garbage data, e.g., data identifying outdated values associated with different data keys. In these instances, the system 100 prioritizes compaction of the two or more files to remove garbage data in the files.

To perform the process 400 for selecting log files for compaction, the system 100 selects (402) two or more files. For example, the system 100 can store log files on a distributed file system 106. The log files can identify requests included in the queue 114 at times when the system 100 flushed the queue 114. The system 100 can select two or more of the log files associated with two or more buckets of the distributed file system 106 as candidate files for compression. Each of the selected log files can be associated with bytes size[ ] that represent an estimate of the cardinality of each of the log files.

The system 100 determines (404) the size of each of the selected log files. In some implementations, the system 100 determines the size of each of the selected files based on the queue 114 by obtaining size data associated with the log files. For example, the queue manager 310 of FIG. 3 can communicate with one or more organizers 330 associated with the selected log files 340(a)-340(N) to obtain information accessible at each of the log files 340(a)-340(N) that identifies the size of the log files 340(a)-340(N). For example, each of the selected log files can be associated with a vector size[ ] that identifies the size of the log file, and the system 100 can access size[ ] for each of the selected log files to determine the size of each of the log files.

In some implementations, the information identifying the size of a particular log file can be information that identifies the estimated cardinality of the log file, where the cardinality is estimated using an HLL algorithm or other method. Data representing the estimated cardinality of the log file can be stored as metadata of the log file[ ]. The queue manager 310 can obtain size[ ] of each of the two or more selected log files and can determine the size of each of the log files based on the information in size[ ]. Alternatively, the queue manager 310 can receive information that identifies the size of each of the two or more log files, where the information indicating the size of each of the log files has been determined from information included in size[ ].

The system 100 determines (406) the combined size of the two or more files based on the sizes of the individual files. As used in this specification, the combined size of two or more files is the arithmetic sum of the individual sizes of each of the two or more files. For example, the system 100 sums the individual sizes of each of the two or more selected log files to determine a combined size for the two or more log files. As an example, a first log file can have a size of 500, e.g., such that the first log file identifies 500 requests to perform on data stored on distributed servers of the system 100. A second log file can also have a size of 500, e.g., such that the second log file also identifies 500 requests. The system 100 determines a combined size of 1000 for the two log files by summing the size of the first and second log files. By summing the sizes of the individual log files, the system 100 determines a total size of a compacted log file that includes the entries of the first and second log files if the first and second log files have no two requested operations in common. Therefore, the combined size of the individual log files represents the size of the resulting compacted log file if the first and second log files are compacted and if no garbage data exists in the two log files.

The system 100 also determines (408) a total size of the two or more selected files. For example, the system 100 determines a total size of the two or more selected log files. As used in this specification, the total size of the two or more selected log files indicates the number of unique requests included in the two or more log files. Thus, the total size of the two or more selected log files indicates a size of the two or more selected log files if the log files were compacted to create a single log file, e.g., the total size of the log files if all garbage data is removed from the log files.

In some implementations, the system 100 determines the total size of the two or more files based on data indicating the size of each of the files. For example, the system 100 can access size[ ] for each of the two or more log files. The system 100 can determine a total size for the two or more log files based on the data in the bytes size[ ]. In some implementations, a particular vector size[ ] identifies the size of a log file as well as the hashed values of entries in the log file, or information identifying the indices and estimated number of elements in each of the indices of a hashed log file. The system 100 can determine the total size of two or more log files by integrating the data identifying the hashed values of entries in each of the log files, or information identifying the indices and estimated number of elements in each of the indices, into a single vector size[ ], and using the integrated vector size[ ] to determine the total size of the two or more log files. For instance, the vectors size[ ] associated with two or more log files can be integrated into a single vector size[ ] and an HLL algorithm performed on the integrated size[ ] can indicate the estimated cardinality of the two or more log files. The estimated cardinality of the two or more log files identifies the size of a log file resulting from compaction of the two or more log files, in other words, the total size of the two or more log files if all garbage data was removed from the log files.

As an example, a first and second log file can both have a size of 500, such that the two files each identify 500 requests. The system 100 can integrate the vectors size[ ] associated with each of the first and second log files to create an integrated vector size[ ]. Based on the integrated size[ ], the system 100 can determine that a total size of the first and second log files is 950, e.g., that the estimated cardinality of the first and second log files is 950.

In other implementations, different methods can be used to determine the estimated total size of the two or more files. For example, the system 100 can combine the two or more log files into a single file without compaction, and the system 100 can perform an HLL algorithm on the single file to determine the estimated total size of the two or more log files.

Once the system 100 determines the combined and total sizes of the two or more files, the system 100 compares (410) the combined and total sizes of the two or more files. For example, the system 100 compares the combined size of the two or more log files to the total size of the two or more log files to determine the difference between the combined and total sizes of the log files. The system 100 can determine the difference between the combined and total sizes of the log files by subtracting the total size of the log files from the combined size of the log files. As the total size of the log files can never be greater than the combined size of the log files, subtracting the total size of the log files from the combined size of the log files will always yield a non-negative result.

The difference between the combined size and the total size of the files indicates the amount of garbage in the two files, e.g., the number of entries that appear in both of the files. For example, the system 100 can determine that two files each having a size of 500 have a combined size of 1000. The system 100 can also determine a total size for the two log files as 950. The system 100 can compare the combined size and the total size and can determine that the difference between the two sizes is 50, e.g., that 50 elements in the first log file also appear in the second log file.

The system 100 determines (412) whether to select the two or more files for compaction based on the comparison of the combined size of the files and the total size of the files. For example, a difference between the combined size and the total size for two log files can be compared to a threshold. If the difference exceeds the threshold, the system 100 can determine that the two log files have sufficient garbage data to perform compaction. Therefore, the system 100 can select the first and second log files for compaction. If the difference does not exceed the threshold, the system 100 can determine that the two log files do not have sufficient garbage data, and the system 100 can bypass performing compaction of the log files.

In some implementations, the system 100 compares the difference between the combined and total sizes for the two or more files to one or more thresholds. The system 100 can adjust the priority of compacting the two or more files based on the difference between the combined and total sizes satisfying one or more of the thresholds. For example, based on the difference between a combined size and a total size for two or more files satisfying a particular threshold, the system 100 can prioritized the two or more files for compaction. Based on the difference between the combined size and the total size for the two or more files not satisfying the threshold, the system 100 can assign the two or more files a low priority for compaction. In some instances, the difference between the combined and total sizes are compared to two or more thresholds, and the system 100 assigns a compaction priority, e.g., a high, medium, or low priority, to the two or more files based on the difference satisfying one or more of the thresholds.

In some implementations, the two or more files are assigned an initial compaction priority. The system 100 then adjusts the compaction priority of the two or more files based on comparing the difference in the combined and total sizes of the files to one or more thresholds. For example, based on the difference between the combined size and the total size of the two or more files satisfying one or more of the thresholds, the system 100 adjusts the compaction priority of the two or more files.

As an example, the system 100 can determine that the difference between a combined size and a total size for two log files is 50, e.g., based on the combined size of the log files being 1000 and the total size of the log files being 950. The system 100 can determine that the difference between the combined size and the total size satisfies a first, lower threshold, e.g. a threshold of 25, but does not satisfy a second, higher threshold, e.g., a threshold of 75. Based on the system 100 determining that the combined size and the total size satisfies the lower threshold but does not satisfy the higher threshold, the system 100 assigns a medium priority for compacting the log files. In another example, if the difference between the combined size and the total size is less than the first threshold, e.g., less than the threshold of 25, the system 100 assigns the two log files a low compaction priority. In still another example, if difference between the combined size and the total size exceeds the second threshold, e.g., the threshold of 75, the system 100 assigns two log files a high compaction priority.

Alternatively, the system 100 initially assigns the two log files a low compaction priority, and based on determining that the difference between the combined size and the total size of the log files satisfies the first, lower threshold, the system 100 adjusts the compaction priority of the two log files to a medium priority. In such an example, if the difference between the combined size and the total size is less than the first threshold, e.g., the threshold of 25, the system 100 can forgo adjusting the compaction priority of the files, or if the difference between the combined size and the total size exceeds the second threshold, e.g., the threshold of 75, the system 100 can adjust the compaction priority of the two files to a high priority.

The system 100 can perform compaction on the files selected for compaction. The system 100 can also forgo compacting those files not selected for compaction. In implementations in which files are assigned compaction priorities, the system 100 can compact files according to their priority, e.g., in an order, where the order of files being compacted is based on the compaction priority of the files. Other factors can be considered when determining to compact files according to their priority. For instance, the system 100 can consider an amount of time that two or more files have been pending compaction when determining which files to compact.

While described primarily with respect to log files, the system 100 can perform the process 400 with respect to any data stored at the distributed file system 106 or elsewhere by the system 100. For example, the system 100 can store data provided by users of the system 100, where the data is distributed across multiple nodes of the system 100, or in multiple buckets of the distributed file system 106. The system 100 can determine the combined size and total size of two or more data files that are distributed in the system 100, and can select data files for compaction based on the combined and total sizes of the data files.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method comprising:
    identifying two or more files, each file being a persistent electronic file stored as a separate file in a persistent file storage, each file including multiple entries;
    determining a respective size of each of the two or more files, each size being an estimate of how many distinct entries exist in the respective file that are not garbage entries;
    determining a combined size of the two or more files, where the combined size of the two or more files is an arithmetic sum of the respective sizes of the two or more files;
    estimating a compacted size of the two or more files, where the estimated compacted size of the two or more files is an estimate of how many distinct entries exist in the two or more files that are not garbage entries when the two or more files are taken together;
    determining that a result of comparing the combined size of the two or more files to the estimated compacted size of the two or more files satisfies a threshold; and
    in response to determining that the result of comparing the combined size of the two or more files to the estimated compacted size of the two or more files satisfies the threshold, compacting the two or more files to generate a single compacted file including multiple entries, where each entry of the single compacted file is a distinct entry that is not a garbage entry.

2. The method of claim 1, wherein determining the respective size of each file comprises:
    obtaining a hashed key value for each entry in the file, wherein the hashed key value is a string of bits that identifies the entry associated with a particular data record in the file, wherein each hashed key value consists of a predetermined number of leading bits followed by a predetermined number of remaining bits;
    determining, based on the predetermined number of leading bits in the hashed key value, one or more indices;
    determining, for each index, a number of leading zeros in the remaining bits of the hashed key value, wherein the number of leading zeros in the remaining bits of the hashed key value is used to estimate a number of entries associated with the index; and
    estimating how many distinct entries exist in the file that are not garbage entries based on the one or more indices and the corresponding one or more numbers of leading zeros in the remaining bits of the hashed key values.

3. The method of claim 1, wherein determining the respective size of each file comprises:

applying a HyperLogLog algorithm to entries in the file; and determining an estimate of how many distinct entries exist in the file that are not garbage entries based on applying the HyperLogLog algorithm to the file.

4. The method of claim 1, wherein the entries of the two or more files are stored in a log-structured merge-tree.

5. The method of claim 1, wherein determining that the result of comparing the combined size of the two or more files to the estimated compacted size of the two or more files satisfies the threshold comprises determining that the combined size of the two or more files is larger than the estimated compacted size of the two or more files by at least a threshold amount.

6. The method of claim 1, comprising:

in response to determining that the result of comparing the combined size of the two or more files to the estimated compacted size of the two or more files satisfies the threshold, adjusting a compaction priority associated with the two or more files, wherein the compaction priority is used to determine when the two or more files are compacted relative to when other files are compacted.

7. The method of claim 1, where each entry of the two or more files represents a request by a user to perform an operation relating to data, wherein the operation relating to data is one of a request to update data, a request to insert data, a request to delete data, or a request to synchronize data with an external data repository.

8. A system comprising:

a plurality of computers; and a non-transitory storage device storing instructions operable to cause the computers to perform operations comprising:

identifying two or more files, each file being a persistent electronic file stored as a separate file in a persistent file storage, each file including multiple entries;

determining a respective size of each of the two or more files, each size being an estimate of how many distinct entries exist in the respective file that are not garbage entries;

determining a combined size of the two or more files, where the combined size of the two or more files is an arithmetic sum of the respective sizes of the two or more files;

estimating a compacted size of the two or more files, where the estimated compacted size of the two or more files is an estimate of how many distinct entries exist in the two or more files that are not garbage entries when the two or more files are taken together;

determining that a result of comparing the combined size of the two or more files to the estimated compacted size of the two or more files satisfies a threshold; and in response to determining that the result of comparing the combined size of the two or more files to the estimated compacted size of the two or more files satisfies the threshold, compacting the two or more files to generate a single compacted file including multiple entries, where each entry of the single compacted file is a distinct entry that is not a garbage entry.

9. The system of claim 8, wherein determining the respective size of each file comprises:

obtaining a hashed key value for each entry in the file, wherein the hashed key value is a string of bits that identifies the entry associated with a particular data record in the file, wherein each hashed key value consists of a predetermined number of leading bits followed by a predetermined number of remaining bits;

determining, based on the predetermined number of leading bits in the hashed key value, one or more indices;

determining, for each index, a number of leading zeros in the remaining bits of the hashed key value, wherein the number of leading zeros in the remaining bits of the hashed key value is used to estimate a number of entries associated with the index; and estimating how many distinct entries exist in the file that are not garbage entries based on the one or more indices and the corresponding one or more numbers of leading zeros in the remaining bits of the hashed key values.

10. The system of claim 8, wherein determining the respective size of each file comprises:

applying a HyperLogLog algorithm to entries in the file; and determining an estimate of how many distinct entries exist in the file that are not garbage entries based on applying the HyperLogLog algorithm to the file.

11. The system of claim 8, wherein the entries of the two or more files are stored in a log-structured merge-tree.

12. The system of claim 8, wherein determining that the result of comparing the combined size of the two or more files to the estimated compacted size of the two or more files satisfies the threshold comprises determining that the combined size of the two or more files is larger than the estimated compacted size of the two or more files by at least a threshold amount.

13. The system of claim 8, wherein the operations comprise:

in response to determining that the result of comparing the combined size of the two or more files to the estimated compacted size of the two or more files satisfies the threshold, adjusting a compaction priority associated with the two or more files, wherein the compaction priority is used to determine when the two or more files are compacted relative to when other files are compacted.

14. The system of claim 8, where each entry of the two or more files represents a request by a user to perform an operation relating to data, wherein the operation relating to data is one of a request to update data, a request to insert data, a request to delete data, or a request to synchronize data with an external data repository.

15. A non-transitory storage device storing instructions operable to cause one or more computers to perform operations comprising:

identifying two or more files, each file being a persistent electronic file stored as a separate file in a persistent file storage, each file including multiple entries;

determining a respective size of each of the two or more files, each size being an estimate of how many distinct entries exist in the respective file that are not garbage entries;

determining a combined size of the two or more files, where the combined size of the two or more files is an arithmetic sum of the respective sizes of the two or more files;

estimating a compacted size of the two or more files, where the estimated compacted size of the two or more files is an estimate of how many distinct entries exist in the two or more files that are not garbage entries when the two or more files are taken together;

determining that a result of comparing the combined size of the two or more files to the estimated compacted size of the two or more files satisfies a threshold; and in response to determining that the result of comparing the combined size of the two or more files to the estimated compacted size of the two or more files satisfies the threshold, compacting the two or more files to generate a single compacted file including multiple entries, where each entry of the single compacted file is a distinct entry that is not a garbage entry.

16. The non-transitory storage device of claim 15, wherein determining the respective size of each file comprises:

obtaining a hashed key value for each entry in the file, wherein the hashed key value is a string of bits that identifies the entry associated with a particular data record in the file, wherein each hashed key value consists of a predetermined number of leading bits followed by a predetermined number of remaining bits;

determining, based on the predetermined number of leading bits in the hashed key value, one or more indices;

determining, for each index, a number of leading zeros in the remaining bits of the hashed key value, wherein the number of leading zeros in the remaining bits of the hashed key value is used to estimate a number of entries associated with the index; and estimating how many distinct entries exist in the file that are not garbage entries based on the one or more indices and the corresponding one or more numbers of leading zeros in the remaining bits of the hashed key values.

17. The non-transitory storage device of claim 15, wherein determining the respective size of each file comprises:

applying a HyperLogLog algorithm to entries in the file; and determining an estimate of how many distinct entries exist in the file that are not garbage entries based on applying the HyperLogLog algorithm to the file.

18. The non-transitory storage device of claim 15, wherein the entries of the two or more files are stored in a log-structured merge-tree.

19. The non-transitory storage device of claim 15, wherein determining that the result of comparing the combined size of the two or more files to the estimated compacted size of the two or more files satisfies the threshold comprises determining that the combined size of the two or more files is larger than the estimated compacted size of the two or more files by at least a threshold amount.

20. The non-transitory storage device of claim 15, comprising:

in response to determining that the result of comparing the combined size of the two or more files to the estimated compacted size of the two or more files satisfies the threshold, adjusting a compaction priority associated with the two or more files, wherein the compaction priority is used to determine when the two or more files are compacted relative to when other files are compacted.

21. The system of claim 11, wherein the log-structured merge-tree comprises two or more hierarchical structures storing entries of the two or more files, each hierarchical structure being distributed on a corresponding node of the persistent file storage.

22. The system of claim 12, wherein the determining that the combined size of the two or more files is larger than the estimated compacted size of the two or more files by at least the threshold amount comprises determining that a number of entries that are outdated entries or redundant entries in the two or more files when the two or more files are taken together exceeds a threshold amount.

23. The system of claim 8, wherein the two or more files are log files sequentially generated by a database system, and wherein the single compacted log file replaces the two or more files.

24. The system of claim 8, wherein the operations comprise:

receiving, at a database system, a request to perform an operation relating to data stored by the system;

adding the request to perform the operation as an entry in a queue of the database system; and transmitting the request to perform the operation from the queue of the database system for storage as an entry in one of the two or more files.

25. The method of claim 1, wherein garbage entries in each particular file are entries that are redundant in the particular file or entries in the particular file that are outdated.

26. The system of claim 8, wherein garbage entries in each particular file are entries that are redundant in the particular file or entries in the particular file that are outdated.

27. The non-transitory storage device of claim 15, wherein garbage entries in each particular file are entries that are redundant in the particular file or entries in the particular file that are outdated.

* * * * *

UNITED STATES PATENT AND TRADEMARK OFFICE
CERTIFICATE OF CORRECTION

PATENT NO. : 9,639,548 B2  
APPLICATION NO. : 14/526416  
DATED : May 2, 2017  
INVENTOR(S) : Swapnil Prakash Bawaskar et al.

Page 1 of 1

It is certified that error appears in the above-identified patent and that said Letters Patent is hereby corrected as shown below:

On the Title Page

Column 1, (72) Inventors, Lines 2-3: Delete "Portland (CA);" and insert --Portland, OR (US);--, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*